United States Patent [19]

Korotkov et al.

[11] 4,224,291
[45] Sep. 23, 1980

[54] METHOD OF DEHYDRATING CARNALLITE

[76] Inventors: Jury A. Korotkov, ulitsa Pyatiletki, 102, kv. 38; Eduard F. Mikhailov, ulitsa Parizhskoi Kommuny, 9, kv. 49; German A. Andreev, prospekt Lenina, 43, kv. 13; Boris I. Eltsov, ulitsa Marata, 80, kv. 38; Jury A. Polyakov, prospekt Lenina, 66, kv 38; Boris G. Shestakov, ulitsa Jubileinaya, 54, kv. 62, all of, Berezniki Permskoi oblasti; Galina D. Kechina, ulitsa Buachidze, 229, kv. 34, Ordzhonikidze Severo-Osetinskoi ASSR, all of U.S.S.R.

[21] Appl. No.: 895,277

[22] Filed: Apr. 10, 1978

[51] Int. Cl.² .............................................. C01F 5/30
[52] U.S. Cl. .................................................... 423/178
[58] Field of Search ................. 423/178; 34/57 E, 10; 432/14, 58

[56] References Cited

U.S. PATENT DOCUMENTS

| 2,924,887 | 2/1960 | Marshall, Jr. | 34/57 E |
|---|---|---|---|
| 3,319,349 | 5/1967 | Heinemann | 34/57 E |
| 3,494,047 | 2/1970 | Geiger et al. | 34/57 E |
| 3,600,817 | 8/1971 | Klein | 34/57 E |

Primary Examiner—O. R. Vertiz
Assistant Examiner—Wayne A. Langel
Attorney, Agent, or Firm—Lackenbach, Lilling & Siegel

[57] ABSTRACT

A method of dehydrating carnallite, residing in that preliminarily enriched carnallite with 39–41 wt. % water is heated up to 205°–230° C. by fuel combustion products having a temperature of 500°–600° C., and a partially dehydrated carnallite with 3–8 wt. % water is obtained. Said dehydrated carnallite is melted in a reaction zone and the melt is subjected to the action of a chlorinating agent. Thereafter the melted carnallite is allowed to settle from solid impurities and, as a result, dehydrated carnallite is obtained with water content less than 0.5 wt. %. The melting of partially dehydrated carnallite with 3–8 wt. % water is performed with the aid of fuel combustion products having a temperature of 700°–1150° C. These products are introduced tangentially to the surface defining the reaction zone at a rate ensuring the formation of an intensive eddy flow of gases, which occupies the whole volume of the reaction zone. The partially dehydrated carnallite is thrown on the side surface of the reaction zone by the eddy flow due to the action of centrifugal forces, a continuous film of the melt being formed on the side surface of the reaction zone. Gases containing the products of fuel combustion and the gases liberating upon interaction of the chlorinating agent with the carnallite melt are removed from the reaction zone.

3 Claims, 1 Drawing Figure

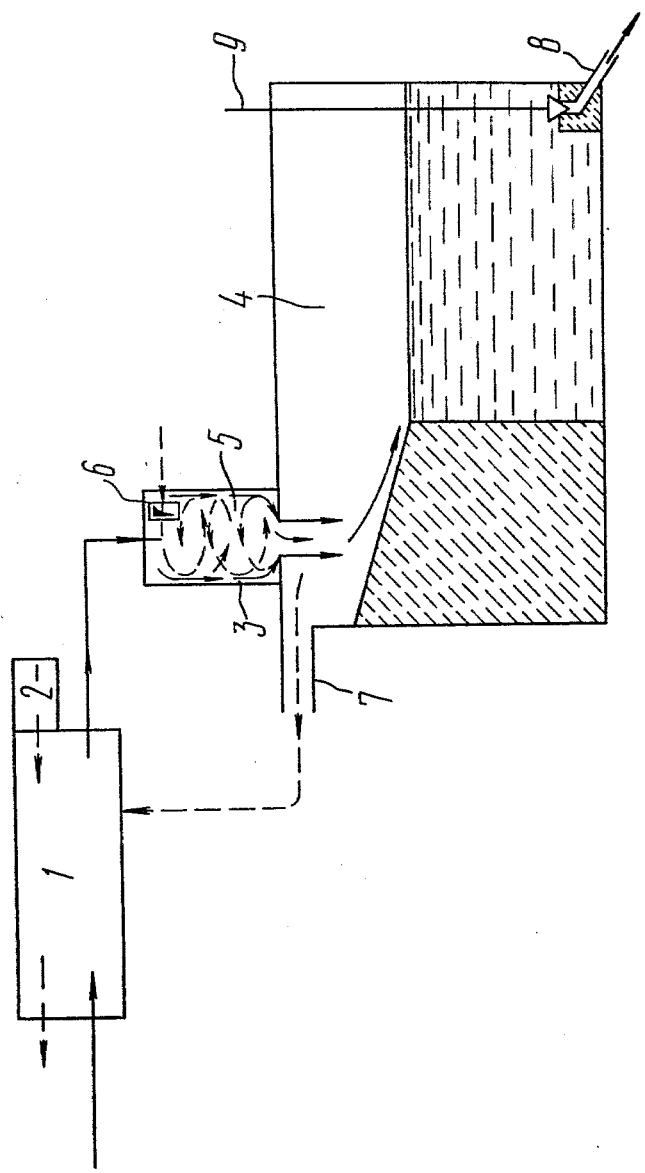

METHOD OF DEHYDRATING CARNALLITE

The present invention relates to chemical engineering processes and more particularly to methods of dehydrating carnallite.

The present invention can be used in the magnesium industry, where dehydrated carnallite is one of the types of stock material for the electrolytic production of magnesium and chlorine, and in the titanium industry.

It is widely known that enriched carnallite, obtained by recrystallization from carnallite rock, is a stock material for the electrolytic production of magnesium. The enriched carnallite contains 31-33% of $MgCl_2$ and 39-41% of $H_2O$, of which 2-4% is hygroscopic water and 35-39% is water of crystallization. The main structural components of the enriched carnallite are hexahydrous carnallite $KCl.MgCl_2.6H_2O$ (85-90 wt.%), parent solution of bischofite $MgCl_2$ in water (5-10 wt.%), and sodium chloride $NaCl$ (4-5 wt.%).

Prior to electrolysis, it is necessary to remove the water. Otherwise electrolytic decomposition of water takes place, which greatly reduces the current yield of magnesium. The process of water of crystallization removal from carnallite is called dehydration.

Carnallite dehydration is performed in two stages.

At the first stage the enriched carnallite is heated in a solid state up to 205°-230° C. by the heat of fuel combustion products. This process is performed in a counterflow or cross flow of the combustion products and the carnallite is heated. The duration of the process is 1.5-2 hours.

In the temperature range from 90° to 130°-140° C. hydroscopic water is removed and hexahydrous carnallite is transformed into the dihydrous form according to the reaction:

$$KCl.MgCl_2.6H_2O \rightarrow KCl.MgCl_2.2H_2O + 4H_2O \uparrow$$

In the temperature range from 150° to 205°-230° C. dihydrous carnallite is partially transformed into dehydrated carnallite according to the reaction:

$$KCl.MgCl_2.2H_2O \rightarrow KCl.MgCl_2 + 2H_2O \uparrow$$

This reaction is accompanied by hydrolysis of magnesium chloride with the formation of magnesium hydroxychloride, and can be schematically presented as:

$$MgCl_2 + H_2O \rightarrow MgOHCl + HCl \uparrow$$

The carnallite semi-product obtained in the process of dehydration in a solid state contains 45-50 wt.% of $MgCl_2$ and 3-8 wt.% of $H_2O$. The main structural components of the carnallite semi-product are dehydrated and dihydrous carnallite (83-88 wt.%), magnesium hydroxychloride (7-11 wt.% or, as calculated for MgO, 2-3 wt.% of MgO), and sodium chloride (5-6 wt.%). The second stage of dehydrating carnallite, i.e. the stage of complete dehydration of the carnallite semi-product with the formation of dehydrated carnallite, is performed by melting the carnallite semi-product, treating the resulting carnallite melt with a chlorinating agent, and settling the melt from the solid impurities. In the known method electrical energy is used as a heat source for melting the carnallite semi-product. The process lasts for 2-2.5 hours.

The melting of carnallite semi-product is performed at 500°-550° C. Under these conditions water is almost completely removed from the melt and magnesium hydroxychloride decomposes with the formation of solid magnesium oxide according to the reaction:

$$MgOHCl \rightarrow MgO + HCl \uparrow$$

Additional hydrolysis of magnesium chloride also takes place, due to which the content of MgO in the melt increases up to 3.5-5 wt.%.

Then the obtained melt is heated up to 700°-800° C. and treated with a chlorinating agent, gaseous chlorine being used as the chlorinating agent which bubbles through the melt. As a deoxidizing agent use is made of petroleum coke (1 wt.% in a mixture with the carnallite semi-product) Upon treatment of the melt with chlorine, partial chlorination of magnesium oxide takes place by the reaction:

$$2MgO + 2Cl_2 + C \rightarrow 2MgCl_2 + CO_2$$

as a result of which the MgO content in the melt decreases down to 2-3 wt.%.

After treating with chlorine, the melt is allowed to settle from solid impurities, mainly from magnesium oxide, at 700°-750° C. The melt of dehydrated carnallite obtained after sedimentation contains 50-52 wt.% of $MgCl_2$, no more than 0.5% of $H_2O$, and no more than 0.8% of MgO. The melt of dehydrated carnallite is subjected to electrolysis with the formation of magnesium and chlorine. Chlorine obtained during electrolysis is partially used as a chlorinating agent for treating the carnallite melt.

In the known method the second stage of carnallite dehydration is characterized, firstly, by low intensity of heat and mass exchange and by the specific efficiency less than 1 t/m³.hr which is typical for the processes performed in bath furnaces; secondly, by the use of an expensive heat source such as electrical energy; thirdly, by difficulties in controlling the process, since it is practically impossible to automate it completely; and, finally, by the necessity to purify the process exhaust gases from chlorine, since only 40-50% of chlorine is used in the process, the rest of it being entrained by the exhaust gases.

It is difficult to control the process of dehydrating the carnallite semi-product since the process is complex, consisting of melting, chlorination and settling.

The complexity and long duration of the process does not allow its complete automation.

It is an object of the invention to intensify the process of dehydrating carnallite at the second stage, namely, at the stage of complete dehydration.

Another object of the invention is to decrease energy consumption at the second stage of carnallite dehydration.

It is also an object of the invention to provide an easily controllable process of dehydrating carnallite at the second stage. This process can be completely automated, and thus considerably reduce the necessary labor input.

Among other objects of the present invention note should be made of a decrease in expenditures on purification of the exhaust gases from noxious substances.

Finally, it is an object of the invention to reduce power inputs at the first stage of dehydrating carnallite.

In accordance with these and other objects, the invention consists of a method for dehydrating carnallite which has been preliminarily enriched with a water content of 39-41 wt.%. The enriched carnallite is heated up to 205°-230° C. by fuel combustion products having a temperature of 500°-600° C. and a partially dehydrated carnallite is obtained containing 3-8 wt.% of water. The partially dehydrated carnallite is fed into a reaction zone where it is melted and the melt is subjected to the action of a chlorinating agent. The melted carnallite is then allowed to settle from solid impurities and, as a result, dehydrated carnallite is obtained with a water content of less than 0.5 wt.%. According to the invention, the melting of partially dehydrated carnallite is performed by fuel combustion products having a temperature of 700°-1150° C., said products being introduced tangentially to the surface defining the reaction zone, at a rate ensuring the formation of an intensive gaseous eddy flow. This flow occupies the entire volume of the reaction zone and throws partially dehydrated carnallite on the side surface of the reaction zone due to centrifugal forces. As a result, a continuous film of the carnallite melt is formed on the side surface of the reaction zone. The gases comprising the fuel combustion products and the gases liberated upon the interaction of the chlorinating agent with the carnallite melt are removed from the reaction zone.

The processes of heat and mass exchange are extremely intensified due to high relative rates (usually about 100 m/sec) between the fuel combustion products and the melt film. As a result, the process of carnallite melting and dehydration becomes highly intensive and cyclone-type.

The herein-proposed method of dehydrating carnallite semi-product considerably reduces energy consumption, since 70-80% of the electrical energy is replaced with the heat releasing upon fuel combustion.

One of the most important characteristics of the high intensity dehydration of the carnallite semi-product is the extremely short duration of the process: half of a second for medium lot production and 2-3 seconds for large-lot production. Low down-time in the process makes possible its complete automation, considerable reduction of labor, and stabilization of the quantity of the obtained dehydrated carnallite.

It is recommended to maintain the rate of feeding the fuel combustion products having a temperature of 700°-1150° C. into the reaction zone within the range of 40-200 m/sec. At a rate less than 40 m/sec the value of the tangential component of the gaseous eddy flow, which is responsible for an intensive heat and mass exchange, is not high enough along the whole height of the reaction zone and the cyclone character of the process disappears. At a rate above 200 m/sec the pressure at which the combustion products are fed into the reaction zone, increases sharply and, as a result, the economic efficiency of the proposed method decreases as compared with the known one.

It is expedient to use as a chlorinating agent hydrogen chloride which is generated by delivering gaseous chlorine into the fuel combustion torch into the zone having a temperature of 1050°-1150° C. Gaseous chlorine, interacting with water vapours of the fuel combustion products, transforms into hydrogen chloride according to the reaction:

$$Cl_2 + H_2O \rightarrow 2HCl + \tfrac{1}{2}O_2$$

Melting of carnallite in an atmosphere containing HCl inhibits $MgCl_2$ hydrolysis and, if the process is performed properly, leads to chlorination of MgO according to the reaction:

$$MgO + 2HCl \rightarrow MgCl_2 + H_2O$$

This reaction does not require introduction of an additional deoxidizing agent as in the case of chlorinating with gaseous chlorine. In addition, purification of the exhaust gases from HCl is much cheaper than from $Cl_2$, since it is performed with water and the solution of HCl thus obtained can be used, for example, for producing of a valuable chemical, $FeCl_3$, which finds wide application in purification of waste waters.

To increase the thermal efficiency of the process of carnallite dehydration and reduce energy consumption at the first stage of dehydration, it is desirable to feed the gases removed from the reaction zone for heating the enriched carnallite up to 205°-230° C.

The gases removed from the reaction zone have a temperature no less than 500° C. and contain fuel combustion products as well as steam and hydrogen chloride in an amount of up to 10 vol.%. Such utilization of the process exhaust gases decreases hydrolysis of magnesium chloride $MgCl_2$ at the first stage of dehydration.

BRIEF DESCRIPTION OF THE DRAWINGS

For a better understanding of other objects and advantages of the present invention a specific example of realizing the method of dehydrating carnallite and a drawing with a schematic representation of the process are given hereinbelow by way of illustration.

Enriched carnallite obtained by recrystallization from carnallite rock and containing 31.5-32.0 wt.% of $MgCl_2$ and 39.5-40.0 wt.% of $H_2O$, of which 1.5-2.0 wt.% is hygroscopic water and 38.0-38.5 wt.% is water of crystallization, is a stock material for electrolytic production of magnesium. The main structural components of enriched carnallite are hexahydrous carnallite $KCl.MgCl_2.6H_2O$ (87-88 wt.%), mother solution of bischofite $MgCl_2$ in water (7-8 wt.%), and sodium chloride NaCl (4-5 wt.%). Prior to use in electrolysis, carnallite is dehydrated in two stages. The first stage of partial dehydration of carnallite is carried out in an apparatus 1 in which preliminarily enriched carnallite is a solid state is heated up to 220° C. by the heat of the products of combustion of natural gas, the temperature of the products being 550°-600° C. In the process of heat exchange with carnallite the temperature decreases to 105°-110° C. Natural gas is burnt in a furnace 2 of the apparatus 1, the process being performed in the counterflow of the combustion products and the carnallite for 2 hours. In the temperature range of 90°-140° C. hygroscopic water is removed from solid carnallite and water of crystallization is partly removed due to transformation of the hexahydrous carnallite to the dihydrous one by the reaction:

$$KCl.MgCl_2.6H_2O \rightarrow KCl.MgCl_2.2H_2O + 4H_2O \uparrow$$

In the temperature range of 150°-220° C. partial transformation of the dihydrous carnallite into the dehydrated form takes place according to the reaction:
$$KCl.MgCl_2.2H_2O \rightarrow KCl.MgCl_2 + 2H_2O \uparrow$$

This is accompanied by hydrolysis of magnesium chloride with the formation of magnesium hydroxychloride which can be presented schematically as:

$$MgCl_2 + H_2O \rightarrow MgOHCl + HCl \uparrow$$

Hydrolysis of magnesium chloride is the main cause for magnesium losses during electrolytic production of magnesium from carnallite, since the products of magnesium chloride hydrolysis do not decompose upon electrolysis but form slime in the reaction zone of magnesium electrolyzers.

Partially dehydrated carnallite, obtained at the first stage of dehydrating carnallite in a solid state, contains 47–48 wt.% of $MgCl_2$ and 5.0–5.5 wt.% of $H_2O$. This main structural components of the partially dehydrated carnallite is dehydrated and dihydrous carnallite (86–87 wt.%); magnesium hydroxychloride (8–8.5 wt.% or, as calculated for MgO, 2.4–2.6 wt.% of MgO) and sodium chloride (5–6 wt.%). Then partially dehydrated carnallite (carnallite semi-product) is treated at the second stage, the stage of complete dehydrating carnallite. The carnallite semi-product is fed into an apparatus 3 where it is melted in the reaction zone and is subjected to the action of a chlorinating agent, thereafter the obtained melt is allowed to settle from solid impurities in a sedimentation tank 4. The melting of the carnallite semi-product and treatment of the obtained melt with the chlorinating agent are performed simultaneously in the same reaction zone. The reaction zone 5 of the apparatus 3 is defined by a vertical rotation surface. Into the upper part of the zone 5 the natural gas combustion products are fed tangentially to the surface thereof through a slot 6. The products are introduced at a rate of 140–150 m/sec at a temperature 700°–1150° C. sufficient for melting the carnallite. Due to high rates of the combustion products, an intensive gaseous eddy flow is formed in the reaction zone 5, which occupies the whole volume of the reaction zone. The carnallite semi-product is introduced from the top of the reaction zone 5. Hydrogen chloride is used as a chlorinating agent. Gaseous chlorine is delivered into the natural gas combustion torch into the zone of 1050°–1150° C. in an amount of 80 $Nm^3$ per 100 $Nm^3$ of the natural gas. Chlorine, interacting with water vapor product of the natural gas combustion, transforms into hydrogen chloride by the reaction:

$$Cl_2 + H_2O \rightarrow 2HCl + \tfrac{1}{2}O_2.$$

The carnallite product, charged into the reaction zone, is involved by a gaseous eddy flow, containing HCl, into an intensive rotation and is thrown by the flow on the side surface of the reaction zone 5 due to the action of centrifugal forces. The carnallite particles melt in the volume and form a continuous film of the melt on the side surface of the reaction zone 5. The melt flows down into the sedimentation tank 4.

The high relative rates between the melt film and the products of natural gas combustion, amounting to 100–120 m/sec, extremely intensify the processes of heat and mass exchange.

In the reaction zone 5, as a result of melting of the carnallite semi-product and the action of the chlorinating agent HCl on the melt obtained, almost complete removal of water from carnallite takes place, partial chlorination of MgOHCl by the reaction:

$$MgOHCl + HCl \rightarrow MgCl_2 + H_2O \uparrow,$$

and decomposition of MgOHCl, remaining after chlorination, with isolation of solid magnesium oxide according to the reaction:

$$MgOHCl \rightarrow MgO + HCl \uparrow.$$

Consumption of the natural gas with a calorific value of 8100–8150 $kcal/Nm^3$ is 75–80 $Nm^3$ per ton of the melt obtained.

The melt flowing from the reaction zone 5 contains 1.8–2.0% of MgO and has a temperature of 500°–520° C. In the sedimentation tank 4 the melt is heated up to 700°–750° C. and allowed to settle from solid impurities, mainly, from MgO. The melt of dehydrated carnallite obtained after sedimentation contains 51–52 wt.% of $MgCl_2$, no more than 0.5 wt.% of $H_2O$, and 0.6–0.8 wt.% of MgO; the melt is used for electrolytic production of magnesium and chlorine.

Exhaust gases containing the products of combustion of natural fuel, steam, and hydrogen chloride are removed from the reaction zone 5 at 600°–650° C. and delivered through a gas duct 7 into the apparatus 1 to the first stage of dehydrating carnallite. The gases introduce 40–50% of the heat necessary for dehydrating carnallite at this stage, thus increasing the total heat efficiency of the process of carnallite dehydrating up to 75–80%.

The melt of dehydrated carnallite is periodically removed from the sedimentation tank 4 through a hole 8, by opening a locking device 9, and the melt is delivered for electrolysis.

EXAMPLE

A melt of dehydrated carnallite, obtained by the method according to the invention, contains:
$MgCl_2$—51–52 wt.%;
$H_2O$—no more than 0.5 wt.%;
MgO—0.6–0.8 wt.%;
KCl and NaCl—the balance.

It is to be understood that the present invention is not limited to the given specific example of realizing the method of dehydrating carnallite.

The method of dehydrating carnallite, according to the invention, ensures specific capacity of 13–15 t/hr of dehydrated carnallite per $m^3$ of the reaction zone, the mean capacity being 10 t of dehydrated carnallite per hour, and complete automation of the process. The residence time of the material in the reaction zone is 1.0–1.5 sec, and the total heat efficiency of the carnallite dehydrating process is 75–80%. Hydrochloric acid obtained upon water purification of the exhaust gases from hydrogen chloride can be used, for example, for producing ferric chloride a valuable chemical.

What is claimed is:

1. In a method of dehydrating carnallite comprising heating preliminarily enriched carnallite, in a solid state with a water content of 39–41 wt.%, up to 205°–230° C., by fuel combustion products having a temperature of 500°–600° C., to produce a partially dehydrated carnallite in a solid state having a water content of 3–8 wt.%, further dehydrating said partially dehydrated carnallite with a drying gas by feeding it into a reaction zone defined by a rotation surface; said drying gas comprising a fuel combustion product introduced into said reaction zone tangentially to the rotation surface at a temperature sufficient to melt the carnallite, and at a rate which ensures the formation of an intensive gaseous eddy flow occupying the entire volume of the reaction zone; the improvement which comprises: contacting the gaseous fuel combustion product, containing water vapor, with gaseous chlorine at a temperature at 1050° to 1150° C., to form HCl, whereby the melted carnallite is thrown against the side surface of the reaction zone, thereby forming a continuous film, and recovering said carnallite melt having a water content of no more than 0.5 wt.%.

2. A method as claimed in claim 1, wherein said gases, removed from said reaction zone, are used for heating the enriched carnallite up to 205°–230° C.

3. The method of claim 1, wherein said gaseous fuel combustion product is delivered into the reaction zone at a rate of 40 to 200 meters/sec.

* * * * *